United States Patent [19]

Lentz et al.

[11] 4,058,879
[45] Nov. 22, 1977

[54] COMPOSITIONS AND METHOD FOR ENHANCING ELECTRICAL LIFE OF POLYMERS USED IN XEROGRAPHIC DEVICES

[75] Inventors: James A. Lentz, Penfield; George J. Safford, Webster, both of N.Y.

[73] Assignee: Xerox Corporation, Stamford, Conn.

[21] Appl. No.: 701,710

[22] Filed: July 1, 1976

[51] Int. Cl.² ............... B60B 5/00; G03G 13/14; B32B 27/40

[52] U.S. Cl. .................................. 29/132; 96/1.4; 101/DIG. 13; 346/153; 427/58; 428/425; 428/517; 428/520; 428/521; 428/522; 526/297; 526/342; 101/DIG. 13

[58] Field of Search ............... 428/425, 521, 522, 517, 428/520; 427/58; 96/1.4; 29/132; 346/74 ES, 153; 355/3 TR, 7; 526/297, 342

[56] References Cited

U.S. PATENT DOCUMENTS

| | | |
|---|---|---|
| 3,252,933 | 5/1966 | Kim et al. ........................... 526/342 |
| 3,702,482 | 11/1972 | Dolcimascolo et al. ..... 101/DIG. 13 |
| 3,920,325 | 11/1975 | Swift ........................................ 96/1.4 |
| 3,959,573 | 5/1976 | Eddy et al. ........................... 428/425 |
| 3,959,574 | 5/1976 | Seanor et al. ........................ 428/425 |

*Primary Examiner*—William R. Dixon, Jr.
*Attorney, Agent, or Firm*—James J. Ralabate; Ernest F. Chapman

[57] ABSTRACT

Butadiene copolymers having controlled electrical life and controlled resistivity are described. A method is disclosed for enhancing the electrical life of butadiene copolymers having solubilized conductivity control agents incorporated therein by varying specified quantities of terminally unsaturated hydrocarbon nitriles in copolymers of the butadiene and the specified nitriles by using mixtures of such copolymers having conductivity control agents therein. The method and polymers are useful for enhancing the electrical life and polymer stability in xerographic devices where control of conductivity and/or relaxation behavior is important, e.g., in bias transfer rolls.

28 Claims, 2 Drawing Figures

FIG. 1

FIG. 2

COMPOSITIONS AND METHOD FOR ENHANCING ELECTRICAL LIFE OF POLYMERS USED IN XEROGRAPHIC DEVICES

BACKGROUND OF THE INVENTION

This invention relates to xerography and more particularly relates to compositions and methods for enhancing or controlling the electrical life and stability of resistivity-controlled butadiene/terminally unsaturated hydrocarbon nitrile copolymers used in xerographic devices.

In the conventional office copier systems, many of the devices and subsystems are made of polymer materials where conductivity control and relaxation behavior (electrical) is important. These polymer materials are also generally characterized by moisture insensitivity, mechanical durability and systems stability. Exemplary of such devices and subsystems include (1) transfer belts, webs and scrolls; (2) photoconductor coatings and overlays; (3) development devices such as donor plates; and (4) durable mechanical devices with electrical stability such as, biased cleaning blades, cleaning brushes, webs or rolls, paper handling devices and static controllers in processor sorters, transport belts and the like. The polybutadiene/terminally unsaturated hydrocarbon nitrile compositions and methods for enhancing or controlling the electrical life and stability of resistivity-controlled butadiene copolymers may be used in these devices and subsystems, and a detailed description is given herein of the utility of these compositions and methods when used to make a biasable transfer member.

In conventional xerography a photosensitive plate, which consists of a photoconductive coating placed over a conductive backing, is charged uniformly and the charge plate is then exposed to a light image of an original. Under the influence of the light image the charge on the plate is selectively dissipated to record the original input information on the plate in the form of a latent electrostatic image. The latent image is developed, or made visible, by applying oppositely charged toner particles to the plate surface in a manner so that the toner particles are attracted into the imaged areas. The developed images are generally transferred from the photoconductor to a final support material, such as paper or the like, and affixed thereto to form a permanent record of the original.

Image transfer from the photoconductor to the final support material may be accomplished by means of a corona induction using a corna generator, or it may be accomplished by a roller or belt electrode biased to a certain potential, such electrode being referred to as a bias transfer member (roll or belt). The corotron system is relatively simple, but the charges deposited by the corotron electrostatically tack the final support material, such as paper, to the original toner support, such as, the photoconductor, in addition to creating the desired electric field affecting transfer of the toner to the paper. The strong attraction between the paper and the original toner support makes it mechanically difficult to separate or detack the two supports.

Transfer of developed images from the photoconductor to the final support material with the aid of a biased transfer member is now well known in the art, and such a member generally avoids severe tacking problems which are encountered when the corona induction system is utilized. A bias transfer roll is disclosed by Fitch in U.S. Pat. No. 2,807,233 where a metal roll coated with a resilient coating having a resistivity of about $10^6$ to $10^8$ ohm cm is used as a bias transfer member. Shelffo in U.S. Pat. No. 3,520,604 suggests that in order to create the proper environment for the duplicating mode, a transfer roll is used and is made of a conductive rubber having a resistivity in the range of from about $10^{11}$ to about $10^{16}$ ohm cm. A bias transfer member, that is, a member for electrically cooperating with a conductive support surface to attract electrically, charged particles from the support surface towards the member, is described by Dolcimascolo et al in U.S. Pat. No. 3,702,482. In Dolcimascolo et al, the bias transfer member has a conductive substrate for supporting a bias potential thereon, an intermediate blanket of, for example, polyurethane rubber, placed in contact with the substrate having an electrical resistivity capable of readily transmitting the bias potential on the substrate to the outer periphery of the blanket and a relatively thin outer coating of, for example, polyurethane, placed over the blanket having an electrical resistivity to minimize ionization of the atmosphere when the transfer member is placed in electrical cooperation with the image support surface and provides a good toner release property enabling the device to be cleaned of the toner.

Other bias transfer members are described by Eddy et al in U.S. Pat. No. 3,959,573 incorporated herein by reference where there is described and claimed biasable transfer members having a coating of a hydrophobic elastomeric polyurethane and having a resistivity in which the change in resistivity is substantially insensitive to changes in relative humidity. Exemplary of the polyurethanes therein, is a polyurethane made by reacting 83.7 percent (by weight) butadiene-acrylonitrile copolymer with 16.2 percent diisocyanate in the presence of a catalyst, the copolymer comprising about 85 percent butadiene and about 15 percent acrylonitrile. Seanor et al in U.S. Pat. No. 3,959,574, incorporated herein by reference, describe and claim biasable transfer members comprising a conductive substrate and at least one coating of an elastomeric polyurethane having an additive therein for controlling the resistivity of the polyurethane, the coating being placed over the conductive substrate. Exemplary of the additives therein which provide a method and composition for controlling the resistivity of biasable transfer members, are the quaternary ammonium compounds.

Although the foregoing references provide polyurethane materials which have many desirable electrical and stability characteristics, it is desirable to improve the electrical life of the materials used in such devices and subsystems. It is also important to control the conductivity or electrical relaxation behavior (ionic mobility versus equilibrium rate between ionized and un-ionized salt so that new ions are provided as electrolysis depletes existing ions of the polymers used in the foregoing devices where concurrent demands for moisture insensitivity, mechanical durability and systems stability are also important. By electrical life is meant controlled (constant) resistivity with time under an applied electrical field. The functional life of a component, such as a bias transfer roll, is directly related to maintenance of this constant controlled resistivity region.

The functional life of the devices using the butadiene copolymerized with terminally unsaturated hydrocarbon nitriles, such as acrylonitrile, of the present invention, for example, bias transfer devices, is largely determined by the stability of the output current and or voltage versus time. Bias roll power supplies are generally constant current or constant voltage output devices with upper current or voltage limits which respond to changes in the resistivity of the bias roll material. Changes in the resistivity of the base material versus time are reflected in voltage demands required to maintain the constant current output of the material of which the device is made. In addition, it is necessary that the additive or additives used to control the V versus I (or resistivity) relationship remain soluble and uniform throughout the transfer material. If additive insolubility occurs, negative xerographic responses such as image washout, field non-uniformities and decreased environmental latitude are known to occur.

Specifically, it has been shown that a highly polar polymer network such as 15 percent acrylonitrile (ACN)/butadiene copolymer with a symmetrical quaternary additive such as tetraheptylammonium bromide (THAB) affords enhanced specified ionization of the additive and therefore improved additive efficiency. This is evidenced by the reduced additive concentration required to attain specific resistivity levels. This higher degree of ionization enables additive to remain soluble but simultaneously results in increased ionic mobility and therefore a more rapid variation in ionic depletion and hence more rapid variation in base roll resistivity. By way of example, the butadiene homopolymer (i.e., no ACN content) requires high levels of quaternary additive (ca. 2 percent) to attain a specific resistivity due to low additive ionization. This low degree of ionization leads to solubility deficiencies of the resistivity control agents in the low polarity matrix with the resultant xerographic problems as previously described. Concurrently, however, this low polarity network results in decreased ion mobilities and hence extended functional electrical life of the material.

OBJECTS OF THE INVENTION

Accordingly, it is an object of the present invention to overcome the foregoing problems and difficulties of providing polymers having extended functional electrical life.

It is an object of this invention to improve devices and subsystems utilizing copolymers having resistivity control agents therein.

It is another object of this invention to improve the electrical life of copolymers of butadiene and terminally unsaturated hydrocarbon nitriles, such as butadiene/acrylonitrile polymers, having conductivity control agents therein.

Another object of this invention is to provide polybutadiene/acrylonitrile compositions having controlled and/or enhanced electrical life.

Still another object of this invention is to provide a method for enhancing the electrical life of copolymers of butadiene and terminally unsaturated hydrocarbon nitrile, such as butadiene/acrylonitrile copolymers, having reduced quantities of resistivity control agent therein without substantially altering the resistivity of the material.

It is also an object of this invention to improve biasable transfer members used for electrically transferring a toner image from a photoconductive surface to a final support sheet.

Still another object of this invention is to provide compositions and methods for making biasable transfer members wherein the electrical life of the biasable members having at least one copolymer of butadiene and terminally unsaturated hydrocarbon nitrile, such as butadiene/acrylonitrile copolymer, with conductivity control agents therein is enhanced without adding amounts of conductivity control agent which would result in supersaturation of the agent in the copolymer.

A further object of this invention is to provide a bias transfer roll having a resilient elastomeric layer, the electrical life of which is substantially improved without altering its resistivity.

SUMMARY OF THE INVENTION

These and other objects of the invention are attained by providing a sufficient amount of an least one terminally unsaturated hydrocarbon nitrile, such as acrylonitrile, with the butadiene to form a copolymer which in the presence of a conductivity control agent incorporated therein, enhances the electrical life of the resultant product. Thus, a butadiene copolymer having from about 1 percent (by weight) to about 12 percent (by weight) acrylonitrile in the copolymer composition in the presence of a conductivity control agent has improved electrical life and polymer stability.

Further, it has been discovered that as the amount of terminally unsaturated hydrocarbon nitrile in the butadiene copolymer decreases, the amount of conductivity control agent must be increased to maintain a constant copolymer resistivity with markedly improved electrical life, the solubility being dependent upon polymer polarity and hence the nitrile concentration. A copolymer having enhanced electrical life also encompasses copolymer admixtures, such as butadiene/acrylonitrile copolymer in admixture with a butadiene/acrylonitrile copolymer having varying amounts of acrylonitrile therein, to provide a blend having effectively from about 1.0 percent to about 12.0 percent (by weight) acrylonitrile, the copolymer having conductivity control agents therein in an amount whereby the conductivity control agent remains soluble as evidenced by the absence of crystallline material when examined microscopically.

In accordance with the present invention, there is also provided a method of controlling or enhancing the electrical life of butadiene copolymer materials having solubilized conductivity control agents therein comprising adding about 1 percent to about 12 percent (by weight) terminally unsaturated hydrocarbon nitrile, such as acrylonitrile, to the copolymer composition. The method may be carried out either by forming a copolymer of the butadiene and the nitrile or by blending copolymers, such as butadiene/acrylonitrile copolymers having varying amounts of acrylonitrile therein, so that the blend has effectively from about 1 to 12 percent (by weight) and more preferably from about 2 to about 8 percent (by weight) nitrile.

Among other xerographic devices and subsystems comprising polymer materials used as coatings, substrates or as the material itself, e.g., as belts, where conductivity control and relaxation behavior (electrical) are important, our invention encompasses biasable transfer members, that is, members capable of electrically cooperating with a conductive support surface to attract charged toner particles from the support surface towards the member, the member having at least one layer comprising an elastomer containing butadiene/nitrile copolymer, such as butadiene/acrylonitrile copolymer, having at least one solubilized resistivity control agent therein with from about 1.0 percent to about 12.0 percent (by weight) terminally unsaturated hydrocarbon nitrile in the copolymer. Basically, the biasable transfer members of the present invention having an enhanced or improved electrical life comprise a conductive substrate for supporting a uniform bias potential thereon and at least one coating comprising an elastomer having a butadiene copolymer with at least one solubilized conductivity control agent therein and from about 1.0 percent to about 12.0 percent terminally unsaturated hydrocarbon nitrile, such as acrylonitrile, in the copolymer. Thus, there is provided a method of controlling or extending the electrical life of a biasable transfer member by coating a conductive substrate for supporting a uniform bias potential with at least one layer of an elastomer having butadiene/acrylonitrile copolymer and at least one solubilized conductivity control agent therein, the copolymer comprising from about 1.0 percent to about 12.0 percent acrylonitrile or an equivalent nitrile and more preferably from about 2.0 percent to about 8.0 percent acrylonitrile. In preferred embodiments, the copolymers of this invention are coated on the conductive substrate in the form of polyurethanes, polyesters and the like. Optionally, the poly(butadiene/co-acrylonitrile) having solubilized conductivity control agents therein, may be coated with a thin outer coating of an elastomeric material to minimize ionization of the atmosphere in and about the contact region.

By the use of the term "biasable transfer member" or "bias transfer roll" is meant a member or roll for electrically cooperating with a conductive support surface to attract electrically charged particles from the support surface towards the member. More specifically, a bias transfer roll is one which electrically cooperates with a photoconductive plate when brought in contact therewith to attract charged toner particles from the plate in the direction of the roll. In this manner, the developed images are transferred from the photoconductor to a final support material, such as paper or the like.

As used herein, poly(butadiene-co-acrylonitrile), butadiene/acrylonitrile polymer, polybutadiene/polyacrylonitrile copolymer, or butadiene polymer having or incorporating acrylonitrile therein, are used interchangeably, and include not only those compositions wherein butadiene and acrylonitrile are formed as a copolymer but also those compositions wherein butadiene/acrylonitrile copolymers having different amounts of acrylonitrile therein are blended together, for example, a butadiene/acrylonitrile copolymer having 2 percent acrylonitrile blended with a butadiene/acrylonitrile copolymer having 4 percent acrylonitrile. The foregoing also applies to the broader statement of the invention wherein the nitrile moiety of the copolymer is a terminally unsaturated hydrocarbon nitrile or a combination of such nitriles capable of copolymerization with butadiene.

Electrical life used herein refers to the functional life of the copolymer materials, e.g., butadiene and butadiene/acrylonitrile polymers, used in various electrical or biasing modes and their ability to continue in operation over a period of time. By electrical life is meant controlled constant resistivity with time under an applied electrical field. This depends in turn upon the ionization of the salt and the mobility of the ions versus the equilibrium rate between ionized and un-ionized salt such that now charge carriers are provided as electrolysis depletes the existing ions. The concentration of nitrile groups must be so adjusted to increase the polaritysolubility/specific ionization on the one hand without excessively enhancing mobility to the detriment of electrical life. In order to obtain the desired enhancement of electrical life in accordance with the present invention, it is critical that the butadiene/nitrile copolymers, such as butadiene/acrylonitrile copolymers, having conductivity control agents therein comprise about 1.0 percent to about 12.0 percent (by weight) of a terminally unsaturated hydrocarbon nitrile, such as acrylonitrile, therein, either as a copolymer or as blended copolymers, and more preferably about 2.0 percent to about 8.0 percent of a nitrile, such as acrylonitrile.

For a better understanding of the invention as well as other objects and further features thereof, reference is had to the following detailed description of the invention to be read in connection with the accompanying drawings.

DESCRIPTION OF THE PREFERRED EMBODIMENTS

The butadiene/nitrile-containing copolymers of the present invention have improved electrical life when the copolymer comprises from about 1.0 percent to about 12.0 percent of a terminally unsaturated hydrocarbon nitrile, such as acrylonitrile, the balance of the copolymer being butadiene. The compositions and method of the present invention are also limited to those copolymers wherein there is a sufficient amount of conductivity control agent in the copolymer to produce a copolymer having the desired resistivity. In accordance with the present invention, preferred resistivities are from about $10^7$ ohm-cm to about $5.0 \times 10^{11}$ ohm-cm and more preferably from about $10^9$ ohm-cm to about $10^{10}$ ohm-cm.

By controlling the terminally unsaturated hydrocarbon nitrile content e.g., percent ACN in acrylonitrile/butadiene copolymers, there is provided a means for controlling the ionic mobility and ionization of conductivity control agents, for example, quaternary salts, and hence a means for controlling or extending the electrical life of the copolymer material itself while maintaining adequate solubility of the conductivity control agents in the butadiene/acrylonitrile copolymer matrix. In order to accomplish this control of and improvement of electrical life, it is important that the copolymer comprise both butadiene and terminally unsaturated hydrocarbon nitrile, such as acrylonitrile, as well as conductivity control agent. Furthermore, it is critical in the practice of the present invention that the copolymer comprise only minor amounts of the nitrile moiety, less than 15 percent but not less than one percent of the nitrile moiety. Butadiene/acrylonitrile copolymers are generally available commercially, and said copolymers are generally available with any desired amount of acrylonitrile therein. However, as described supra, the present invention is limited only to those butadiene/a- crylonitrile copolymers having less than 15 percent acrylonitrile (by weight) but not less than one percent (by weight) acrylonitrile in the copolymer. In preferred embodiments, the preferred copolymer having the desired acrylonitrile content are prepared in accordance with well-known commercial processes and are obtained in the form of for example, liquids. The viscosity of these liquids is dependent upon the acrylonitrile content and the molecular weight. Although the molecular weight of the copolymers is not critical in the practice of the present invention, it is generally desired to have copolymers with molecular weights ranging from about 1,000 to about 5,000 or alternatively expressed having equivalent weights from about 500 grams/equivalent to about 2,500 grams/equivalent. These parameters vary for gums, resins and other forms and can be readily adjusted by one skilled in the art. The preferred copolymers of the present invention are homogeneous liquid or fluid polymers. In accordance with the present invention, the butadiene/acrylonitrile copolymers may be commercially obtained or manufactured by available commercial processes with an acrylonitrile content of less than 15 percent acrylonitrile but not less than one percent acrylonitrile and the balance being butadiene. Alternatively, the desired acrylonitrile content may be obtained by mixing or blending at least two butadiene/acrylonitrile copolymers so that the blend effectively has an acrylonitrile content of less than 15 percent but not less than about one percent, perferably from about 1.0 percent to about 12.0 percent and more preferably from about 2.0 to about 8.0 percent. In preparing the polymer blends, it is important that the butadiene/acrylonitrile copolymers form a homogeneous liquid or fluid polymer blend rather than a mere suspension of the one copolymer in the other copolymer. For example, in preparing such a blend, a copolymer having an effective acrylonitrile content may be prepared by mixing or blending a butadiene/acrylonitrile copolymer having an acrylonitrile content of 2 percent with a butadiene/acrylonitrile copolymer having an acrylonitrile content of about 10 percent.

Although the preferred copolymers of the present invention are the poly(butadiene/coacrylinitriles), other copolymers may also be used where the nitrile moiety or nitrile-containing portion of the copolymer is generally a terminally unsaturated hydrocarbon nitrile capable of copolymerization with butadiene. Examples of other terminally unsaturated hydrocarbon nitriles which may be substituted throughout the specification and claims for acrylonitrile, include straight-chain and branched hydrocarbon nitriles having preferably from about 2 to about 12 carbon atoms, where the hydrocarbon portion is terminally unsaturated. More preferred nitrile moieties include propionitrile, methacrylonitrile, butyronitrile, allyl acetonitrile, dodecenylnitrile, and the like. The general chemical expression for these terminally unsaturated hydrocarbon nitriles is R—C≡N where R is an unsaturated, straight or branched chain hydrocarbon having preferably from about 2 to about 12 carbon atoms. As used herein, the expressions of the copolymer as containing nitrile, nitrile moiety, terminally unsaturated hydrocarbon nitrile and acrylonitrile are used interchangeably.

Critical in the preparation of the compositions and critical in the methods of the instant invention is the fact that the butadiene/nitrile-containing copolymer having a terminally unsaturated hydrocarbon nitrile content of less than 15 percent but not less than one percent is the use of a conductivity control agent which is soluble in the copolymer composition, and which is especially soluble in copolymer compositions having the low nitrile moiety content of less than 15 percent but not less than one percent. The conductivity control agents are mixed or blended into the homogeneous liquid or fluid copolymer solution until they are dissolved therein, it being critical that no greater amount of conductivity control agent be incorporated or mixed into the copolymer solution than will remain soluble therein. Thus, the conductivity control agent is described as being solubilized in the copolymer. The solubility of this particular additive, a conductivity control agent, is also important in any further compositions such as further polymerized copolymer, polyurethanes, cross-linked copolymer, and other embodiments and compositions which incorporate the butadiene/nitrile-containing copolymer composition set forth herein. In all instances, it is deemed critical that the conductivity control agent remain solubilized in the composition. It is for this reason that it is critical to maintain a terminally unsaturated hydrocarbon nitrile, such as acrylonitrile, content in the copolymer composition of no less than about one percent so that the solubility of the conductivity control agent incorporated therein will be promoted or maintained in the copolymer. For example, although the electrical life of a copolymer composition of butadiene and acrylonitrile may be substantially improved when the copolymer composition comprises less than about 1.0 percent acrylonitrile, such a great quantity of conductivity control agent must be added to the copolymer composition to maintain suitable resistivities that the conductivity control agent becomes insoluble.

The conductivity control agents which are incorporated in the copolymers in accordance with the present invention, for controlling or adjusting the resistivity may be ionic and include organic dyes, organic pigments, organic salts, polyelectrolytes, inorganic salts, inorganic pigments, and charge transfer complexes or materials which produce charge transfer complexes with the copolymer. Of course, as indicated supra, the useful conductivity control agents in accordance with the present invention must be solubilized in the copolymer, that is they must be soluble in the liquid or fluid copolymer and in those embodiments wherein solid compositions are formed, the conductivity control agent or agents must be solubilized in the solid composition. To determine if the conductivity control agent remains solubilized in the solid compositions, a microscopic/DSC examination of the material can be made to visually inspect for crystalline material or other types of solid conglomerations identifiable in the solid composition comprising the butadiene/acrylonitrile copolymers. Thus, in order to be effective as conductivity control agents for controlling the resistivity of the compositions in accordance with the present invention, the agents must be soluble in the copolymer or the composition containing the copolymer. The conductivity control agents may be worked into the copolymer or compositions comprising the copolymer by any suitable manner known to those skilled in the art, including incorporating a solution of the additive in a suitable solvent in the copolymer or composition comprising the compolymer or by directly mixing the conductivity control agent into the homogeneous liquid or fluid copolymer. Furthermore, the conductivity control agents useful in the present invention must not interfere with subsequent condensation reactions, cross-linking or other reactive modes to which the copolymer containing the solubilized conductivity control agent is subjected and should not cause gellation of the copolymer or any subsequent reaction product comprising the copolymer in the effective amount incorporated therein to decrease or increase the resistivity of the butadiene/nitrile-containing copolymer beyond the desired level.

Examples of the conductivity control agents which are useful herein, are described in the specification of U.S. Pat. No. 3,959,574, previously indicated as being incorporated herein by reference. Examples of organic dyes, quaternary ammonium compounds, polyelectrolytes, charge transfer complexes, and other materials designated as additives are clearly described therein.

The most preferred class of conductivity control agents for controlling the resistivity of the copolymers or compositions comprising the copolymers in accordance with the present invention are the quaternary ammonium compounds and include such materials as tetraheptyl ammonium bromide, trimethyloctadecyl ammonium chloride, benzyl trimethyl ammonium chloride, and the like. A general formula for suitable quaternary ammonium compounds is set forth and described in the above-specified patent incorporated herein by reference.

The amount of conductivity control agent generally required in the copolymers and compositions comprising the copolymers of the present invention is generally from about 0.01 percent (by weight) to about 6.0 percent (by weight) based upon the weight of the copolymer. As indicated supra, the upper limit of the conductivity control agent to control resistivity of the copolymer or composition comprising the copolymer is limited only by the solubility of the particular conductivity control agent in the copolymer or the composition comprising the copolymer. Thus, quantities greater than about 6.0 percent of the conductivity control agent can be used in preparing the copolymers having solubilized conductivity control agents therein, but only insofar as the solubility limitations permit. Generally, amounts of conductivity control agent less than about 0.05 weight percent or greater than about 1.75 weight percent are not required for achieving the desired resistivity and other desired characteristics of the copolymers and compositions comprising copolymers in acccordance with the present invention.

In accordance with the present invention other optional additives may also be used which will not intefere with the life span, the resistivity, the solubilization of the conductivity control agent and the polymer polarity or ionic mobility of the compositions of the present invention. These additives include certain plasticizers, antioxidants, and the like.

The homogeneous fluid or liquid butadiene/nitrile-containing copolymers having solubilized conductivity control agents therein may be used for any application which requires conductive fluids having an extended or controlled electrical life or may be used in the preparation of solid compositions comprising the copolymer having solubilized conductivity control agents therein. Accordingly, in preferred embodiments the butadiene/acrylonitrile copolymer having conductivity control agents therein may be reacted with any suitable agent to convert the copolymer fluid or liquid having conductivity control agents therein to an elastomer, a polymeric foam material, a polymer film, and the like, or the copolymer may be cross-linked with suitable cross-linking agents, or the copolymer fluids may be further polymerized with suitable polymerization agents and processes including catalysts to form solid copolymer materials in accordance with the present invention. These embodiments are referred to herein as compositions comprising copolymers having conductivity control agents therein and more specifically may be described as compositions comprising butadiene/nitrile-containing copolymers or butadiene/acrylonitrile copolymers having conductivity control agents therein.

Among the compositions comprising butadiene/acrylonitrile copolymers having conductivity control agents therein are included those wherein the copolymer is reacted with a suitable functional material or reaction product capable of forming a solid composition having the improved electrical life characteristics. In these embodiments, it remains critical that the acrylonitrile content of the copolymer is from about 1.0 percent to about 12.0 percent and the conductivity control agent concentration is sufficient to produce a reaction product having a resistivity at the desired level and preferably within the range of about $10^7$ to about $5.0 \times 10^{11}$ ohm-cm. When the butadiene/acrylonitrile copolymer having conductivity control agent therein is reacted with a suitable functional agent or reacting material capable of forming a product having improved electrical life, there is formed a reaction product of the butadiene/acrylonitrile copolymer having conductivity control agent therein with the functional agent.

Examples of reaction products which may be formed in accordance with the present invention, include the reaction product of the copolymers of this invention and a diisocyanate to form a polyurethane having improved electrical life; the reaction product of the copolymer with a dibasic acid to form an elastomeric ester having improved electrical life; the reaction product of the copolymer with a difunctional epoxy to form an epoxy product having improved electrical life; the reaction of the copolymer with suitable cross-linking agents well known in the art to form the cross-linked copolymer havng improved electrical life; and the further polymerization of the fluid or homogeneous liquid copolymer in the presence of suitable polymerization agents including catalysts well-known in the art to form a copolymer product having improved electrical life; all of the foregoing products having conductivity control agents therein within the designated amounts, and all of the reaction products comprising the butadiene/nitrile-containing copolymers having less than 15 percent terminally unsaturated hydrocarbon nitrile but not less than 1.0 percent of the nitrile and the balance of the copolymer being butadiene.

Typical of the process for preparing the foregoing reaction products is the reaction of the diol of the acrylonitrile-butadiene copolymers of the present invention having conductivity control agents therein with di- or tri-functional acids, for example, dibasic acids such as adipic acid, azelic acid, debacic acid and the like, to form elastomeric esters; with isocyanate, for example, the aromatic or aliphatic diisocyanates, to form polyurethanes; with di-functional epoxys to form epoxy reaction products; and the like. Other conductive elastomers, films, foams and the like having improved electrical life, may also be prepared by cross-linking the butadiene/acrylonitrile copolymers having conductivity control agents therein by typical sulfur vulcanization techniques well known in the art or by further polymerization of the copolymers themselves utilizing typical free radical catalyst polymerization techniques and catalysts well-known in the art.

The polycondensation-type reactions leading to the formation of the elastomeric polyurethanes which have improved electrical life in accordance with the present invention, are influenced by a number of factors, prominent among which are the structure of the isocyanate, including its functionality and the type and location of substituents; the structure of the polyhydroxy compounds; the solvent used in the dilution of the system; the presence of impurities; and the temperature, particularly above about 100° C. One skilled in the art can adjust these parameters to prepare suitable elastomeric polyurethanes having the above-described properties for the embodiments useful in the present invention.

The formula for a typical butadiene/acrylonitrile copolymer is shown below:

where $a$ is greater than 0.85 but not greater than about 0.99 and $b$ is less than 0.15 but not less than 0.01 and $n$ is about 78-87. In more preferred embodiments, $b$ is about 0.02 to about 0.08 and $a$ is about 0.98 to about 0.92.

When the foregoing hydroxy terminated butadiene/acrylonitrile copolymer having conductivity control agent therein is reacted with a diisocyanate, a polyurethane product having conductivity control agent therein and having improved electrical life in accordance with the present invention is produced.

The general formula for a diisocyanate is:

where D is a 36-carbon hydrocarbon radical. A typical diisocyanate prepared from linoleic acid in a Diels Alder-type reaction, the product of which is hydrogenated, would form the following typical diisocyanate formula:

The foregoing chemical formula and reactions are set forth and described in U.S. Pat. No. 3,959,573.

The foregoing copolymers and compositions comprising the copolymers having the conductivity control agents therein have utility in various devices and mechanisms, especially those where belts, coatings, membranes, rolls, and the like require materials having controlled conductivity or where relaxation (electrical) behavior is important and where concurrent demands are made for moisture insensitivity, mechanical durability and systems stability. Special utility is found in the application of the copolymers and compositions comprising the copolymers of the instant invention as biasable transfer members used in xerographic devices and systems. Other areas of utility include (1) transfer belts, webs and scrolls; (2) photoconductor coatings or overlays; (3) development devices such as donor plates used in xerography; and (4) durable mechanical devices with electrical stability requirements such as biased cleaning blades, cleaning brushes, webs or rolls, paper handling devices and static control in processor sorters, transport belts and the like.

Exemplary of the utility of these materials are the biasable transfer members described in the patents incorporated herein by reference by previous designation.

Figure 1:
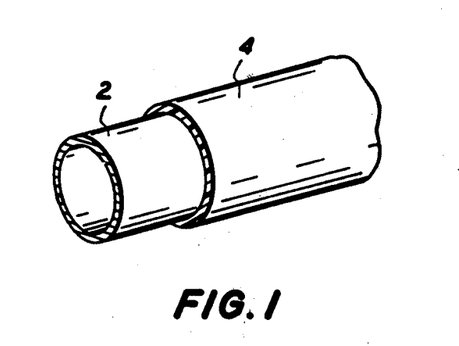
FIG. 1 is a perspective view in partial section showing the construction of a bias transfer roll having an elastomer comprising butadiene/acrylonitrile copolymer and at least one conductivity agent therein coated upon a conductive substrate.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is the elastomeric polyurethane comprising the butadiene/acrylonitrile copolymer having conductivity control agent therein of the present invention. Outer coating 4 which is formed of a resilient elastomeric material is preferably about 0.25 inch in thickness having a hardness between about 40 Shore 00 and about 40 Shore A and preferably about 10-25 durometers. Where coating 4 minimizes ionization of the atmosphere in and about the contact region of the bias transfer member with the photoconductor; where it has suitable mechanical stability; and where it is easy to clean, the elastomeric polyurethane may be the outermost coating on the bias transfer member. It is preferred that the resilient elastomeric polyurethane comprising butadiene/acrylonitrile copolymer having conductivity control agent therein and less than 15 weight percent but greater than one weight percent acrylonitrile, have a resistivity of between about $10^7$ and $5.0 \times 10^{11}$ ohm-cm. In accordance with the present invention, the coating of the conductive substrate must be formulated of at least one layer of the specified elastomeric polyurethanes. By coating the biasable transfer member (roll) with this particular class of polyurethanes comprising butadiene/acrylonitrile coplymers, the resistivity of the biasable transfer roll is controlled and the electrical life of the roll is improved. Generally, resistivity of the roll also remains substantially unchanged when changes in relative humidity occur. Thus, the elastomeric polyurethanes comprising the butadiene/nitrile-containing copolymers of this invention, such as the butadiene/acrylonitrile copolymers, used as the outer coating of the bias transfer member of FIG. 1 have substantially improved electrical life.

Figure 2:
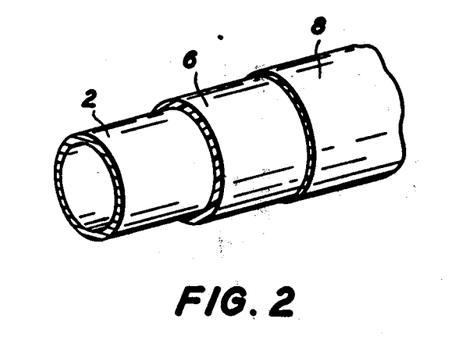
FIG. 2 is a perspective view in partial section showing the construction of a bias transfer roll having an elastomer comprising butadiene/acrylonitrile copolymer and at least one conductivity control agent therein as a resilient blanket or relaxable layer intermediate the conductive substrate and a relatively thin outer coating.

Referring now to FIG. 2, wherein there is shown a cutaway view of a biasable transfer roll and a clearillustration of the internal construction thereof, there is shown a rigid hollow cylinder 2 that is fabricated of a conductive metal, as in FIG. 1, capable of readily responding to a biasing potential placed thereon. Over the rigid hollow cylinder 2 is placed a relatively thick resilient intermediate blanket 6 of the elastomeric polyurethane material comprising butadiene/acrylonitrile copolymer having a hardness of between about 40 Shore 00 and about 40 Shore A. The elastomeric polyurethane may be about 0.125 inch to about 0.625 inch in thickness and is preferably 0.25 inch in thickness, having sufficient resiliency to allow the roll to deform when brought into moving contact with the photoconductive drum surface to provide an extended contact region in which the toner particles can be transferred between the contact bodies. Intermediate blanket 6, which is comparable to layer 4 in FIG. 1, should be capable of responding rapidly to the biasing potential to impart electrically the charge potential on the core to the outer extremities of the roll surface and should have improved electrical life. The blanket, therefore, should have a resistivity of between about $10^7$ and $5.0 \times 10^{11}$ ohm-cm, and preferably about $10^9$ to about $10^{10}$ ohm-cm. Over the intermediate blanket is placed a relatively thin outer coating 8 which according to the prior art bias transfer rolls, may be an elastomeric material such as a polyurethane having a resistivity of between $10^{10}$ and $10^{15}$ ohm-cm and which preferably has a thickness of about 0.0025 inch and a hardness of about 65–75 D durometer. Ionization of the atmosphere in and about the contact region is minimized in accordance with the discussion set forth above relating to the resistivity of the outer coating.

The outer layer 8, known also as a self-leveling layer, is a leaky insulator, and is generally selected for its higher resistive values than those of resilient blanket (relaxable layer) 6. In addition, outer layer 8 includes materials, or is so related to relaxable layer 6, such that charges applied to the outer surface of layer 8 will be generally dissipated within one revolution of the roll. Layer 8 also acts as a thin insulating layer to help protect resilient blanket 6 during air breakdown, to limit current flow through the roll, and to make the roll surface easy to clean. When the relaxable material, i.e., the resilient, elastomeric polyurethane comprising butadiene/acrylonitrile copolymer of this invention, is durable and cleanable, layer 8 is not required, and the roll of FIG. 1 may be used as a biasable transfer member. Furthermore, in accordance with the present invention, relative humidity problems are generally reduced or eliminated, and outer layer 8 need not act as a moisture barrier to prevent resistivity changes in resilient blanket 6 due to changes in relative humidity. Thus, when the biasable transfer members of this invention are coated with at least one layer of the elastomeric polyurethane comprising butadiene/nitrile-containing compositions of this invention, such as butadiene/acrylonitrile compositions, the resistivity thereof can be controlled and the electrical life is increased or enhanced.

The hardness of the elastomeric polyurethanes and other compositions of the present invention is not critical but in the case of biasable transfer members it is recommended that such compositions have a hardness between about 40 Shore 00 to about 40 Shore A, and preferably about 10–25 Shore A. The control of the hardness is within the purview of those skilled in the art, and the hardness can be controlled by such parameters as by varying the NCO/OH ratio, by varying the type of reactants utilized, and by using various additives such as plasticizers.

In accordance with the present invention, there is described a method of improving the electrical life of a biasable transfer member having at least one coating of an elastomeric reaction product of a butadiene/nitrile-containing copolymer and a diisocyanate upon a conductive substrate for supporting a uniform bias potential therein by adjusting the concentration of the nitrile moiety in the copolymer to a level within a range of about 12.0 percent to about 1.0 percent (by weight); dissolving a conductivity control agent in the copolymer in an amount which produces the desired resistivity; reacting the copolymer having the conductivity control agent solubilized therein with the diiocyanate to produce a polyurethane; and coating the polyurethane on the conductive substrate. The nitrile, e.g., acrylonitrile, in the copolymer of the foregoing method may also be adjusted by blending butadiene/nitrile copolymers having different amounts of terminally unsaturated hydrocarbon nitrile therein whereby the resulting blend effectively has from about 1.0 percent to about 12.0 percent nitrile as an alternative to adjusting the level of the nitrile to the desired amount in a single butadiene/nitrile-containing copolymer composition. The foregoing method for improving the electrical life of the elastomeric coating on the biasable transfer member may be carried out without substantially effecting the resistivity of the member by decreasing the nitrile concentration in the butadiene/nitrile-containing copolymer and increasing the amount of conductivity control agent in the copolymer, the amount of conductivity control agent being limited by the solubility of the agent in the copolymer in decreased concentrations of the nitrile moiety.

In accordance with the present invention, there is also described a method of extending and/or controlling the electrical life of copolymers of butadiene and terminally unsaturated hdyrocarbon nitriles by incorporating conductivity control agents which are asymmetrical quaternary ammonium cations or structural charge specific anious in the copolymer. Thus, the conductivity control agents in preferred embodiments include quaternary ammonium compounds where the cation is asymmetrical or compounds having structural charge specific anions. Examples of the asymmetrical quaternary ammonium compounds include trimethyloctadecyl ammonium chloride, benzyltrimethyl ammonium trioctyl propyl ammonium bromide, and the like. In the general formula where $R_1$, $R_2$, $R_3$, and $R_4$ each represent at least one carbon atoms and may be in the form of branched-chains or unbranched chains, saturated or unsaturated and substituted or unsubstituted, at least one of $R_1$, $R_2$, $R_3$, or $R_4$ must differ from the other R moieties in the molecule. X may be any of the halogens and preferably bromine or chlorine, or any of the salts having structural charge specific anions, such as for example, perchlorate, benzoate, nitrile, nitrate sulfate, sulfite, acetate and the like. In preferred asymmetrical cations, at least one R has a carbon chain comprising no greater than one-half the length of the carbon chains of the remaining R's.

The same effect, that is, control of the electrical life may be carried out by adding salts having structural charge specific anions and symmetrical cations to the copolymer. Salts having structural charge specific anions are those wherein the anion portion of the salt has distinct charge distribution points as opposed to those anions which have uniform charge distribution about the anion. Thus, there is a multiple point distribution of the charge in the atoms of the anion. Examples of such anions are given above. The salts having the structural charge specific anions and symmetrical anions include the ammonium salts and the phosphonium salts. Exemplary of the ammonium salts are those having the general formula:

where $R_1$, $R_2$, $R_3$ and $R_4$ each represent at least one carbon atom (preferably alkyl groups, all R's are alike, and R may be substituted or unsubstituted, branched-chain or unbranched, and saturated or unsaturated and $A^-$ may be any structural charge specific anion, such as those described above.

To reduce the ionic mobility, and thereby enhance and/or control electrical stability or life, these conductivity control agents may be added in generally preferred amounts of about 0.01 percent (by weight) to about 6.0 percent (by weight) based upon the weight of the copolymer reaction product in which they are incorporated, for example, the polyurethane. The upper limit or concentration of these conductivity control agents is limited only by the solubility of the agent in the copolymer and in the copolymer reaction product. The most effective copolymer concentrations which the asymmetrical quaternary ammonium compounds or structural charge specific anions are useful in controlling the electrical life are those wherein the copolymer of butadiene and a terminally unsaturated hydrocarbon nitrile comprises no less than about 4 percent of the hydrocarbon nitrile, and preferably from about 8 percent to about 14 percent of the terminally unsaturated hydrocarbon nitrile.

The following specific examples illustrate more clearly the copolymers and compositions comprising butadiene/acrylonitrile copolymers of the instant invention which may be used in prepaeing the biasable transfer members for controlling the electrical life of biasable transfer member, although the invention is not to be construed as limited in its scope thereby.

EXAMPLES

Slabs of polyurethane were prepared by reacting 83.7 percent (by weight) butadiene/acrylonitrile copolymer, supplied by Arco Chemical Company, having various amounts of acrylonitrile therein as shown in Table 1 below, with 16.2 percent diisocyanate, supplied by General Mills under the trade designation DDI 1410, in the presence of 0.1 percent conventional catalyst supplied by Argus Chemical under the trade designation Catalyst U1-19. The copolymers comprise the designated percentage of acrylonitrile as indicated in Table 1 with the balance of the copolymer being butadiene. Percentages are given in percentage by weight. The copolymers generally had hydroxy values in meq. per gm. of 0.60 and viscosity at 30° C of about 525 poise. The hardness of the reaction products where about 29 Shore A.

Prior to the formation of the polyurethanes, a conductivity control agent, tetraheptyl ammonium bromide, was added to the homogeneous liquid copolymer having the designated acrylonitrile content therein in the quantities shown in Table 1 below. The concentrations of the tetraheptyl ammonium bromide (shown in weight percent based on the weight of the copolymer) were adjusted to provide a resistivity for the final polyurethane material of $3 \times 10^9$ ohm-cm. The resistivities were measured by conventional techniques known to those skilled in the art. The tetraheptyl ammonium bromide was added to the liquid copolymer until solution was complete, stirring the tetraheptyl ammonium bromide into the copolymer solution. Except for the polymer composition shown in Table 1 as containing 0 percent acrylonitrile, a tetraheptyl ammonium bromide was soluble in the designated polymer solutions.

TABLE 1

BIAS TRANSFER ROLL LIFE OF POLYURETHANES COMPRISING VARIOUS BUTADIENE/ACRYLONITRILE COPOLYMER COMPOSITIONS

| Polymer Composition (% ACN) (a) | K' (b) | THAB Conc (wt. %) | DC Current Stability (c) | Roll Life (hrs) (d) | THAB (e) |
|---|---|---|---|---|---|
| 15% | 7.5 | .07 | 20 mins. | 15 hrs. | OK |
| 8% | 5.8 | .40 | 40 | 140 | OK |
| 4% | 5.1 | .90 | 90 | 200 | OK |
| 2% | 5.0 | 1.5 | 180 | Not tested | OK |
| 0% | 3.5 | 2.0 | 450 | 300+ hrs | Insoluble at 1.0–1.5 THAB |

THAB designated tetraheptyl ammonium bromide conductivity control agent.
(a) % ACN by weight in base resin.
(b) Relative dielectric constant. A measurement of polarity.
(c) Time for the initial current, under a constant 10 volts/mil potential, to decay to ½ its initial level.
(d) Time required in constant current (25 microamps) continuous operating mode for power supply to reach its 5.5 KV limit.
(e) Microscopic DSC examination for crystalline material.

Two fluid butadiene/acrylonitrile copolymers, one copolymer having 8 percent acrylonitrile content and the other copolymer having an acrylonitrile content of 2 percent were blended together in a 50:50 blend. Tetraheptyl ammonium bromide conductivity control agent was mixed in the blend so that the copolymer composition comprised 1.0 weight percent of the conductivity control agent. The copolymer blend containing the conductivity control agent was mixed with a diisocyanate as set forth in the Examples above to form a polyurethane slab. The slab was tested to determine the time required in constant current (25 microamps) continuous operating mode for a power supply to reach its 5.5 KV limit was 200 hours. A microscopic examination for crystalline materials showed that the tetraheptyl ammonium bromide remained soluble in the polyurethane.

The objects of the present invention have been amply demonstrated by the above examples. Elastomeric polyurethanes comprising butadiene/acrylonitrile copolymers having conductivity control agents therein and having from 2 percent to 8 percent acrylonitrile in that composition have shown substantially improved electrical life (roll life) while maintaining solubility of the conductivity control agent. Furthermore, it has been shown that as the acrylonitrile content in the composition varies, the conductivity control agent can be varied therein so that the resistivity of the particular polyurethane remains at or near a constant level. In Table 1 above, the resistivity of the polyurethane material was $3 \times 10^9$ for all compositions. It has also been shown by the foregoing examples that control of the acrylonitrile content (percent ACN) in acrylonitrile/butadiene copolymers provides a means for controlling the ionic mobility and ionization of quaternary salts and hence extends the electrical life of transfer devices while maintaining adequate solubility for the conductivity control agents in the butadiene/acrylonitrile matrix.

While this invention has been disclosed with reference to the structure and compositions disclosed herein it is not necessarily confined to the details as set forth and this application is intended to cover such modifications or changes as may come within the scope of the following claims.

What is claimed is:

1. A transfer roll having improved electrical life for electrically cooperating with a photoconductive plate when brought into contact therewith to attract charged toner particles from the plate toward the roll comprising a rigid cylindrical core of electrically conductive material having at least one coating thereon of a resilient elastomeric material comprising a copolymer of about 1.0 percent to about 12.0 percent terminally unsaturated hydrocarbon nitrile and the balance butadiene, said copolymer containing a sufficient amount of conductivity control agent to produce a copolymer having the desired resistivity, the conductivity control agent being solubilized in the copolymer.

2. The transfer roll of claim 1 further comprising an outer resilient coating placed over the elastomeric coating, the outer coating having a resistivity to minimize ionization of the surrounding atmosphere in and about the zone of contact between the transfer roll and the photoconductive plate.

3. The transfer roll of claim 2 wherein the resilient elastomeric coating intermediate the cylindrical core and the outer resilient coating has a resistivity of between about $10^7$ and about $5 \times 10^{11}$ ohm-cm.

4. The transfer roll of claim 1 wherein the terminally unsaturated hydrocarbon nitrile is acrylonitrile.

5. The transfer roll of claim 1 wherein the elastomer comprises a butadiene/acrylonitrile copolymer having about 2.0 percent to about 8.0 percent acrylonitrile.

6. The transfer roll of claim 1 wherein the elastomeric material is the reaction product of a diisocyanate and a butadiene/acrylonitrile copolymer having from about 1.0 percent to about 12.0 percent of the acrylonitrile therein and a conductivity control agent therein.

7. A biasable transfer member comprising a conductive substrate for supporting a uniform bias potential thereon and at least one coating thereon comprising an elastomeric material having improved electrical life and comprising a copolymer of butadiene and a terminally unsaturated hydrocarbon nitrile having solubilized conductivity control agent therein, the copolymer having from about 1.0 percent to about 12.0 percent of the terminally unsaturated hydrocarbon nitrile therein, the coating being placed over the conductive substrate.

8. The biasable transfer member of claim 7 further comprising an outer coating placed over the elastomeric coating having improved electrical life, the elastomeric material being resilient, whereby the elastomeric material coating having improved electrical life forms a resilient blanket in contact with the substrate, the elastomeric material having an electrical resistivity such that the blanket is capable of transmitting a bias potential from the substrate to the outer periphery of the blanket.

9. The biasable transfer member of claim 7 wherein the elastomeric material having improved electrical life has a resistivity of between about $10^7$ and $5.0 \times 10^{11}$ ohm-cm.

10. The biasable transfer member of claim 7 wherein the electrical life of the elastomeric material increases as the amount of the terminally unsaturated hydrocarbon nitrile copolymer having solubilized conductivity control agents therein is decreased.

11. The biasable transfer member of claim 7 wherein the terminally unsaturated hydrocarbon nitrile portion of the butadiene/terminally unsaturated hydrocarbon nitrile copolymer comprises about 2.0 percent to about 8 percent of the copolymer.

12. The biasable transfer member of claim 7 wherein the butadiene/terminally unsaturated hydrocarbon nitrile copolymer having conductivity control agent therein comprises a blend of at least two copolymers, the blend effectively having a terminally unsaturated hydrocarbon nitrile content from about 1.0 percent to about 12.0 percent.

13. The biasable transfer member of claim 12 wherein the nitrile portion of the blend is from about 2.0 percent of about 8.0 percent.

14. The biasable transfer member of claim 7 wherein the conductivity control agent is the amount required to adjust the resistivity of the elastomer material to the desired level within the range of about $10^7$ to about $5.0 \times 10^{11}$ ohm-cm.

15. The biasable transfer member of claim 14 wherein the conductivity control agent is from about 0.05 percent to about 1.75 percent (by weight) of the butadiene/terminally unsaturated hydrocarbon nitrile copolymer.

16. The biasable transfer member of claim 7 wherein the terminally unsaturated hydrocarbon nitrile is acrylonitrile.

17. The biasable transfer member of claim 7 wherein the elastomeric material is prepared by the reaction of the butadiene/nitrile-containing copolymer with a suitable functional agent capable of forming an elastomer suitable for coating a conductive substrate.

18. The biasable transfer member of claim 7 wherein the elastomeric material is the reaction product of a diisocyanate and a butadiene/acrylonitrile copolymer having solubilized conductivity control agent therein.

19. The biasable transfer member of claim 17 wherein the elastomeric material is a polyurethane and is the reaction product of a diisocyanate and a hydroxy-terminated butadiene/acrylonitrile copolymer, the acrylonitrile content being from about 1.0 to about 12.0 percent of the copolymer.

20. A method of improving the electrical life of a biasable transfer member having at least one coating of an elastomeric reaction product of a butadiene/nitrile-containing copolymer and a diisocyanate upon a conductive substrate for supporting a uniform bias potential thereon comprising adjusting the nitrile content in the copolymer to a level within the range of about 12.0 percent to about 1.0 percent (by weight); dissolving a conductivity control agent in the copolymer in an amount which produces the desired resistivity; reacting the copolymer having the conductivity control agent solubilized therein with the diisocyanate to produce a reaction product; and coating the reaction product on the conductive substrate.

21. The method of claim 20 wherein the nitrile portion in the butadiene/nitrile-containing copolymer is about 8.0 percent to about 2.0 percent.

22. The method of claim 20 wherein the nitrile is acrylonitrile.

23. The method of claim 22 wherein the conductivity control agent is a quaternary ammonium compound and is increased from about 0.07 weight percent up to about 1.75 weight percent.

24. The method of claim 23 wherein the quaternary ammonium compound is asymmetrical.

25. The method of claim 20 wherein the nitrile in the copolymer is adjusted by blending butadiene/nitrile copolymers having different amounts of nitrile therein whereby the resulting blend effectively has from about 1.0 percent to about 12.0 percent nitrile, the nitrile being a terminally unsaturated hydrocarbon nitrile.

26. The method of improving the electrical life of the elastomeric coating on the biasable transfer member in accordance with claim 20 without substantially effecting the resistivity thereof comprising decreasing the nitrile concentration in the butadiene/nitrile copolymer and increasing the amount of conductivity control agent in the copolymer, the amount of conductivity control agent being limited by the solubility of the agent in the copolymer at decreased concentrations of the nitrile.

27. The method of claim 24 wherein the electrical life is increased by decreasing the nitrile content of the copolymer from a high concentration of about 15 percent (by weight) to about 12.0 percent or less but greater than about 1.0 percent.

28. The method of claim 27 wherein the amount of conductivity control agent is increased from about 0.01 weight percent up to that amount of conductivity control agent which does not dissolve or remain dissolved in the copolymer.

* * * * *